United States Patent [19]

Anderson et al.

[11] 4,361,429
[45] Nov. 30, 1982

[54] METHOD AND APPARATUS FOR PRESSING GLASS ARTICLES

[75] Inventors: Elmer L. Anderson, Corning; Kenneth L. Goodrich, Beaver Dams; Robert C. Hillman, Rock Stream, all of N.Y.

[73] Assignee: Corning Glass Works, Corning, N.Y.

[21] Appl. No.: 303,002

[22] Filed: Sep. 17, 1981

[51] Int. Cl.³ ................... C03B 11/00; C03B 13/00
[52] U.S. Cl. ............................. 65/67; 65/70; 65/72; 65/93; 65/177; 65/184; 65/245
[58] Field of Search ............... 65/67, 70, 185, 184, 65/72, 87, 93, 177, 245

[56] References Cited

U.S. PATENT DOCUMENTS

| | | | |
|---|---|---|---|
| 1,670,110 | 5/1928 | Frasier | 65/93 |
| 2,724,214 | 11/1955 | Guilleminot | 65/184 |
| 3,114,620 | 12/1963 | Giffen | 65/145 |
| 3,193,367 | 7/1965 | Giffen | . |
| 3,231,356 | 1/1966 | Giffen | . |
| 3,338,698 | 8/1967 | Morris | 65/184 |
| 3,528,791 | 9/1970 | Giffen | 65/67 |
| 3,582,304 | 6/1971 | Bognar | 65/109 |
| 3,582,306 | 6/1971 | Giffen | . |
| 3,582,454 | 6/1971 | Giffen | . |

Primary Examiner—Robert L. Lindsay, Jr.
Attorney, Agent, or Firm—Burton R. Turner

[57] ABSTRACT

Method and apparatus are set forth for forming articles from molten sheet glass wherein the molten sheet glass initially substantially conforms to a mold cavity by a combination of vacuum and/or gravity, and then while still in a semi-molten condition the sheet is pressed into a finished ware article.

12 Claims, 11 Drawing Figures

METHOD AND APPARATUS FOR PRESSING GLASS ARTICLES

BACKGROUND OF THE INVENTION

In the past, it has been customary to form glass articles by various known methods including pressing, blowing, spinning, or vacuum forming molten glass into a desired configuration. The conventional press and blow and blow and blow processes are generally limited to the formation of hollow articles and require rather complex apparatus and multiple process operations. Standard gob pressing procedures permit the pressing of a variety of glass articles, however, due to the mass of the molten glass gob which must be distributed during the pressing and the inherent cooling of the glass due to the residence contact time between the mold and the plunger, the thinness to which such articles can be pressed without detrimental surface defects and checking is severely limited.

Vacuum forming has the advantage of not only being able to form articles from laminated sheet material, but also the ability to form relatively thin articles. However, in normal vacuum forming processes, the upper surface of the article being formed follows the contour of the bottom of the article in contact with the mold surface, such that any changes in the contour of the bottom of the article are reproduced on the top surface thereof whether or not desired. Thus, it is not possible to form footed articles such as plates which may be stacked with a standoff, in view of the fact that the upper surface of the plate would follow the contour of the foot formed in the bottom of the plate, thus disrupting the plate surface. Vacuum forming of sheet material also precludes the provision of crisp or sharp blends of angled surface intersections, since the upper surface of the sheet which is not in contact with the sharp demarcation provided in the mold surface, will merely form a radius at such intersection, independent of the sharp section which may be formed on the bottom surface which is in contact with the mold. Accordingly, it is virtually impossible to vacuum form an embossed surface with any discernable clarity in the upper surface of a vacuum formed article.

Various processes and apparatus may be utilized in the vacuum forming of articles from sheet glass including a horizontal conveyor type of apparatus as shown in U.S. Pat. No. 3,114,620 and a turret or rotary wheel type of apparatus as shown in U.S. Pat. No. 3,231,356. The trimming of such vacuum formed articles is shown in U.S. Pat. Nos. 3,193,367 and 3,582,454, with the latter patent being specifically directed to the trimming of articles vacuum formed from laminated glass sheet.

Although vacuum forming of articles from glass sheet, whether of a unitary or laminated construction, has been known in the past, it has been a principal object of the present invention to provide method and apparatus for improving upon the vacuum forming of articles from sheet glass by incorporating the pressing of the sheet while still in a molten condition and thereby facilitate the formation of thinly pressed articles with controlled upper and lower surface contours of desired configuration.

SUMMARY OF THE INVENTION

Thin glass articles having specifically defined upper and lower surfaces are formed from a sheet of molten glass deposited upon a mold assembly. The thickness of the sheet delivered to the mold assembly may be varied to produce articles of desired thickness or thinness, and laminated sheet may be delivered to the mold assembly to produce desired products such as strengthened articles and articles with improved surface durability. The sheet of molten glass initially overlies the mold cavity and surrounding mold assembly, with those portions of the sheet immediately adjacent the bounding periphery of the cavity being retained in spaced-apart relationship with respect to the mold assembly so as to retain sufficient heat to permit the subsequent trimming of the formed article from the sheet without checking.

The sheet of molten glass initially conforms to the contour of the mold cavity, either by the force of gravity alone or in conjunction with a vacuum applied to the mold cavity which draws the sheet downwardly into the general contour of the cavity. A plunger is then applied to the upper surface of the sheet so as to press the article from the center thereof toward the edge to prevent air entrapment along the upper surface. Simultaneously with the pressing, glass is forced from the lower or mold side of the article into contours formed in the mold cavity, and any trapped air which may have been in such contours is moved outwardly and removed therefrom by vent openings. The pressed article is then trimmed from the remainder of the glass sheet by shearing that relatively hot glass suspended about the periphery of the mold cavity, and the trimmed article is then removed from the cavity and the remainder of the sheet.

DESCRIPTION OF THE PREFERRED EMBODIMENTS

Figure 1:
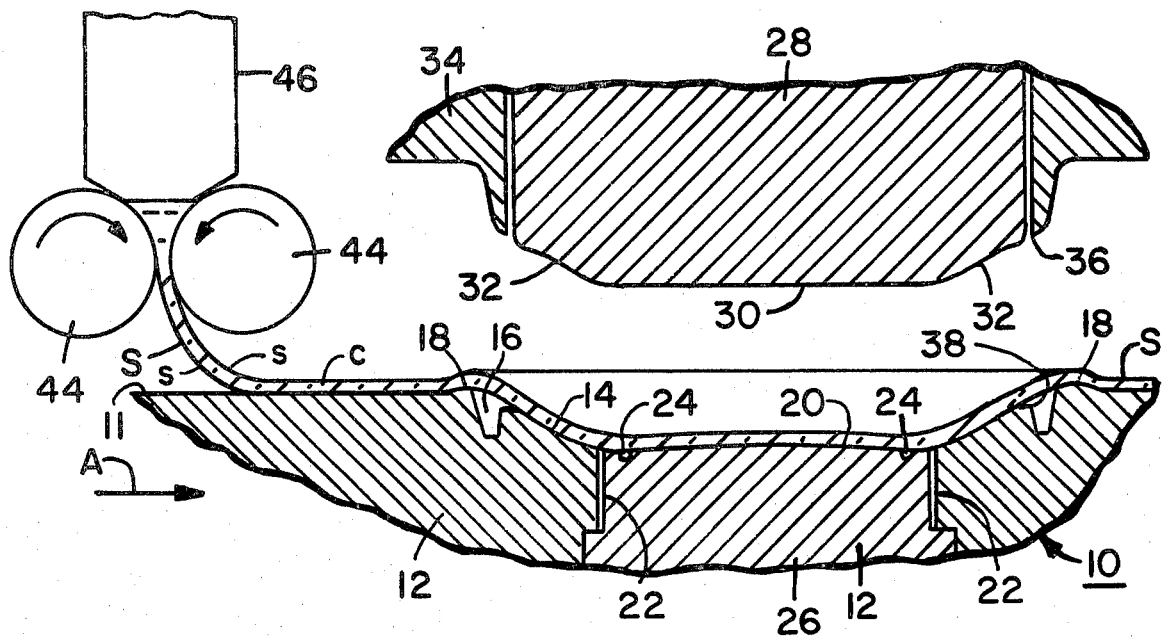
FIG. 1 is a schematic fragmental sectional view in elevation illustrating the loading of a sheet of molten glass upon a mold assembly.

Referring now to the drawings, a mold assembly 10 is shown comprising a mold 12 having a cavity 14 surrounded by a trimming recess 16 and a draw ring portion 18. The mold cavity 14 has a bottom surface 20 provided with vent or vacuum passageways 22, and contoured recesses or indentations 24 for forming desired patterns or contours in the bottom surface of an article formed within the mold 12. Although not necessary, the central portion of the mold 12 communicating with bottom surface 20 of mold cavity 14 may be formed of an insert or separate mold part 26, for ease in providing the vent or vacuum passageways 22 and the contoured recesses 24.

Figure 4A:
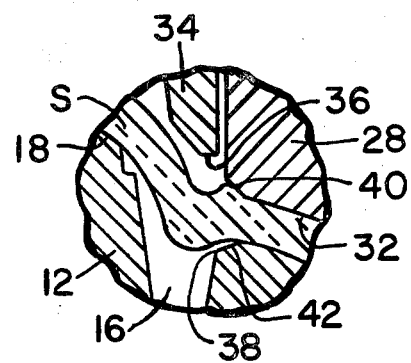
FIG. 4a is a greatly enlarged fragmental sectional view in elevation showing a portion of the mold assembly illustrated in FIG. 4.

A plunger 28 is shown having a central nose portion 30 with tapered side portions 32 conforming to the configuration of the mold cavity 14. A trimming member 34 surrounds the plunger 28 in axial alignment with trimming recess 16 and has a trimming edge 36 which cooperates with trim edge 38 of the recess 16. As noted particularly in FIG. 4a, the plunger 28 is chamfered or beveled at 40 adjacent the recess 16, and the mold 12 is also chamfered or beveled at 42 adjacent recess 16 to facilitate trimming as set forth hereinafter.

The mold assembly 10 may be moved along a predetermined path as represented by arrow A in FIG. 1 as a sheet of molten glass S is laid down over the upper surface 11 of the assembly by means of a pair of rollers 44 delivering molten glass from a suitable feeder 46. The feeder may deliver either a one-layer sheet of glass, or a laminated sheet of glass having a core c and outer skins s, such as is delivered by the feeder shown in U.S. Pat. No. 3,582,306. Further, the mold assembly 10 may be positioned upon a turret such as shown in U.S. Pat. No. 3,231,356 or upon an endless conveyor such as shown in U.S. Pat. No. 3,114,620.

Figure 1A:
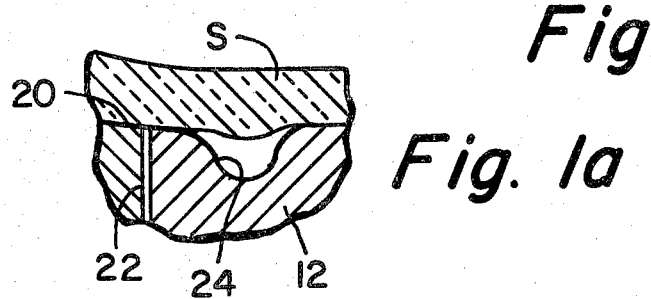
FIG. 1a is a greatly enlarged sectional fragmental view in elevation showing a portion of the mold illustrated in FIG. 1.

As shown in FIG. 1, as the mold assembly 10 is moved under the feeder 46, a sheet of molten glass S is deposited thereon so as to overlie mold cavity 14 and surrounding surface portions 11, and initially begins to conform to the contour of the mold cavity 14 of mold 12 due to sagging caused by gravity. The trimming recess 16 and the raised draw ring portions 18, surrounding the outer peripheral portion of the cavity 14, maintain the glass sheet S out of contact with the mold 12 about such peripheral portions, and accordingly the amount of heat extracted from such portions is materially less than those portions in physical contact with the mold assembly per se. A vacuum may be applied to the mold cavity 14 adjacent bottom surface 20 by means of vacuum passageways or slots 22. Depending upon the desired glass distribution within the mold cavity 14, the vacuum may be applied immediately after the sheet of molten glass S is deposited upon the mold assembly, or such vacuum may be applied after the sheet has initially sagged partially within the mold cavity. Also, although not shown in the drawing, a vacuum may be applied about the draw ring 18 so as to pull the upper bounding area of molten glass on surface 11 away from the plunger travel, and partially thin out upper areas of the ware. As shown in FIG. 1a, the application of the vacuum through vent passages or grooves 22, which are outboard of the contoured recesses or indentations 24, causes the glass sheet S to substantially seal the passageways 22 at their junction with the bottom surface 20 of cavity 14, and positive air pressure within contoured recesses 24 causes the sheet to bridge such recesses.

Figure 2:
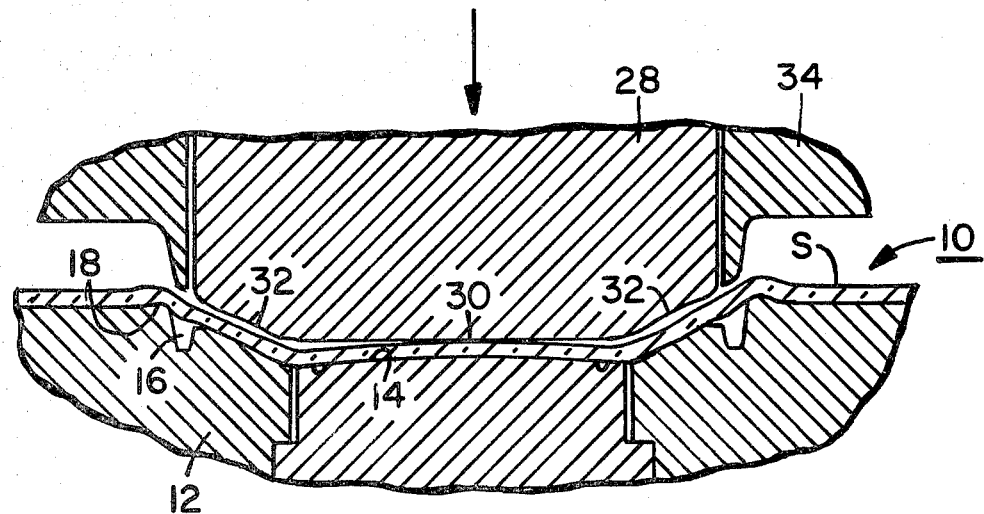
FIG. 2 is a fragmental sectional view in elevation illustrating the initial pressing of the glass sheet delivered to the mold assembly.
Figure 3:
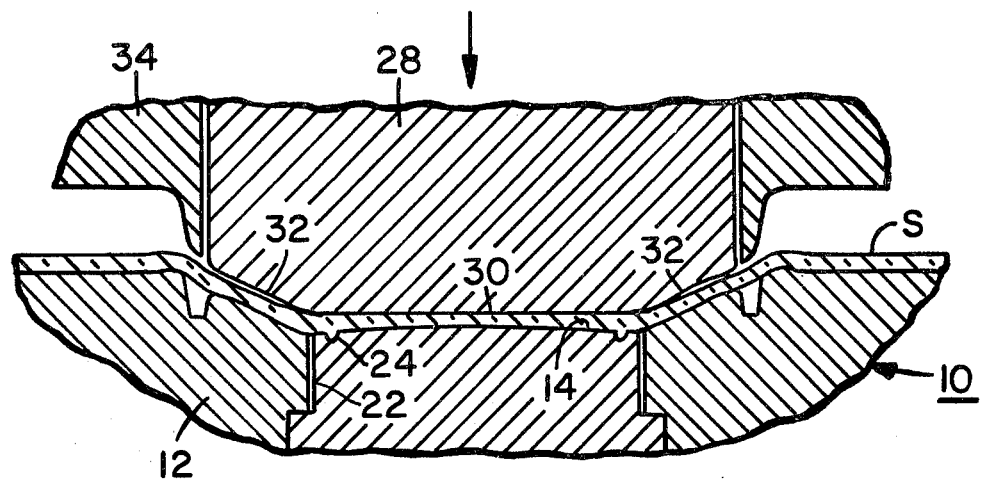
FIG. 3 is a fragmental sectional elevational view illustrating an intermediate pressing step.
Figure 3A:
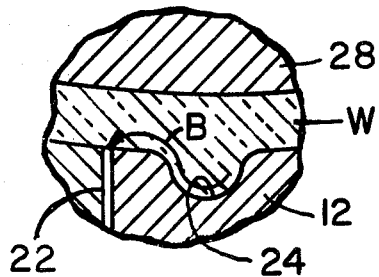
FIG. 3a is a greatly enlarged fragmental sectional view in elevation showing a portion of the mold illustrated in FIG. 3.
Figure 4:
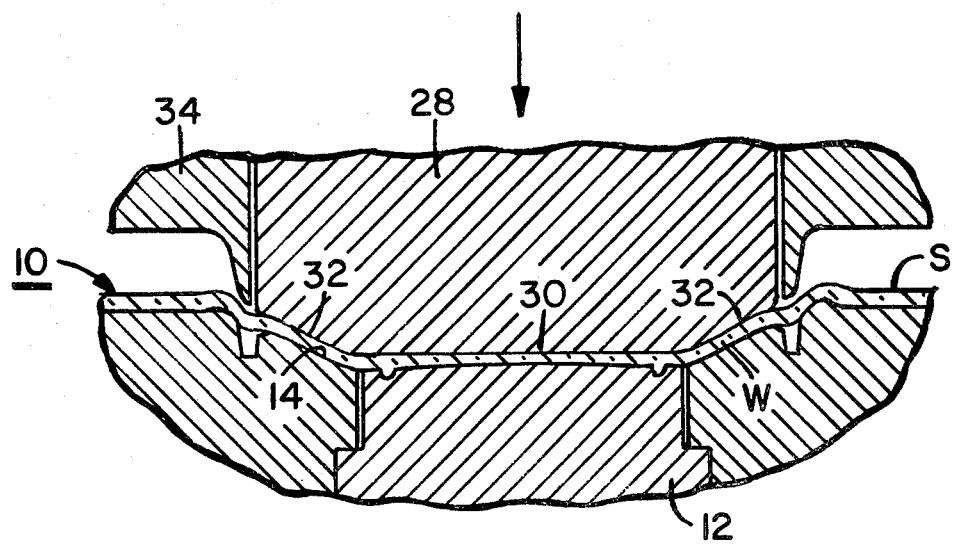
FIG. 4 is a fragmental sectional elevational view illustrating the final pressing of the article within the mold.

As shown in FIGS. 2, 3 and 4, the plunger 28 is then moved downwardly to press the sheet glass S within the cavity 14 into a ware article W. As noted particularly in FIGS. 2 and 3, the central nose portion 30 of the plunger 28 initially contacts a central portion of the sheet within the cavity 14 such that pressing occurs from the center of the cavity toward edge portions thereof thus preventing air entrapment on the upper surface. As noted in FIG. 2, only the central nose portion 30 of the plunger 28 is in initial contact with the sheet, however, as the plunger continues downwardly, the entire central portion 30 engages the sheet as shown in FIG. 3, and finally the tapered side portions 32 of the plunger engage the sheet S to press form the ware article W. As the pressing progresses over the bottom surface 20 of the mold cavity 14, the glass is forced from the lower side of the sheet, which initially bridged the recesses 24 as shown in FIG. 1a, into the recesses as shown in FIG. 3a. Air which had been trapped in the recesses moves outwardly toward the vent or vacuum passageways 22 during the center-to-edge pressing, such that the air is vented through the passageways 22 as shown by arrow B.

Upon completion of the pressing, central nose portion 30 and tapered side portions 32 of plunger 28 are in full engagement with the upper surface of the sheet S within the mold cavity 14. However, as will be noted in FIG. 4a, the plunger 28 is chamfered or beveled at 40 adjacent the trimming recess 16, whereas the mold 12 is chamfered or beveled at 42 adjacent such recess so as to inhibit the chilling of the sheet in such area and thereby maintain the glass temperature for facilitating the trimming operation. Were it not for the recess 16 and bevels 40 and 42, the glass would be chilled sufficiently so that during the trimming of the newly formed article W from the sheet S, crizzling in the form of detrimental tear checks and pull checks would be produced about the edge of the article.

Figure 5:
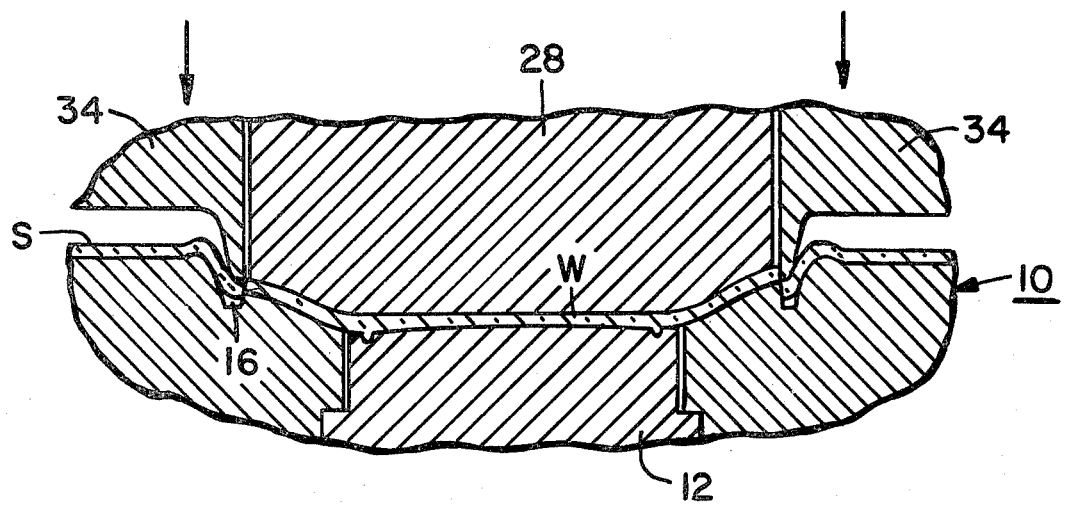
FIG. 5 is a fragmental sectional view in elevation illustrating the trimming of the pressed article from the surrounding sheet of glass.
Figure 5A:
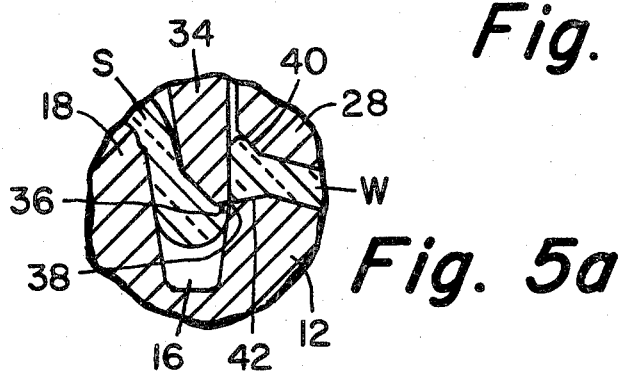
FIG. 5a is a greatly enlarged fragmental sectional view in elevation showing a portion of the trimming area illustrated in FIG. 5.

Referring now to FIGS. 5 and 5a, the trimming operation is shown wherein the cutting edge 36 of the trimmer 34 is moved downwardly through the relatively soft sheet of glass S, suspended by the draw ring portion 18 over the trimming recess 16, such that the trim edge 36 cooperates with the trim edge 38 of the mold 12 to completely sever the newly formed ware article W from the remainder of glass sheet S. Here again, due to the fact that the glass sheet surrounding the peripheral edge portions of the mold cavity 14 is out of direct contact with the mold and plunger assembly due to the recess 16 and bevels 40 and 42, the glass is maintained at a sufficiently high temperature so as to facilitate the shearing or trimming of the article from the sheet glass without checking the glass.

Figure 6:
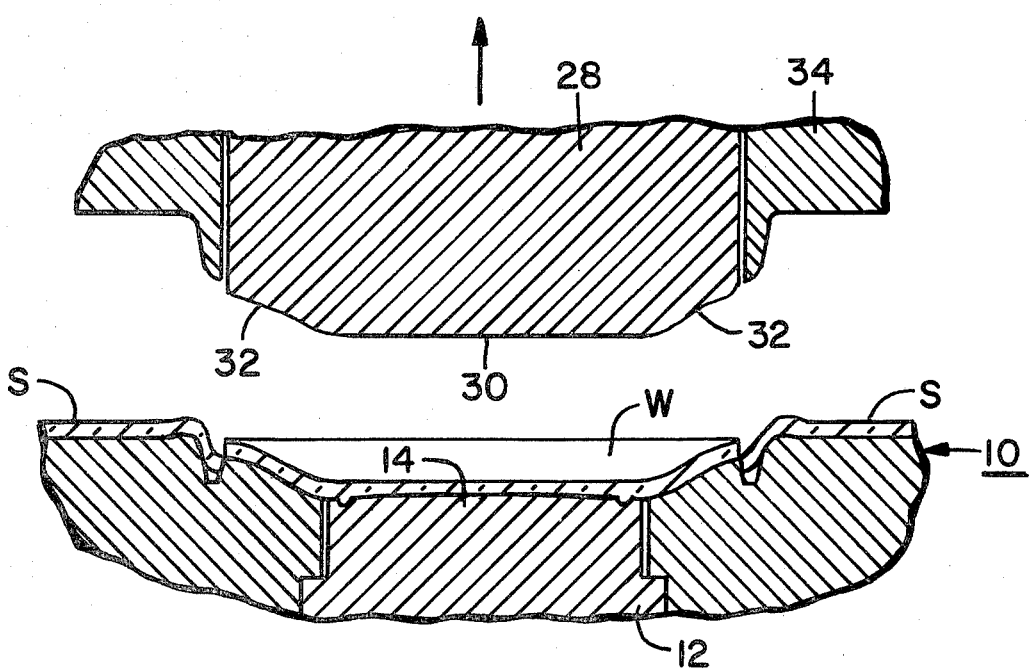
FIG. 6 is a fragmental sectional view in elevation illustrating the pressed and trimmed article resting in the mold with the plunger and trimmer in a partially retracted position.
Figure 7:
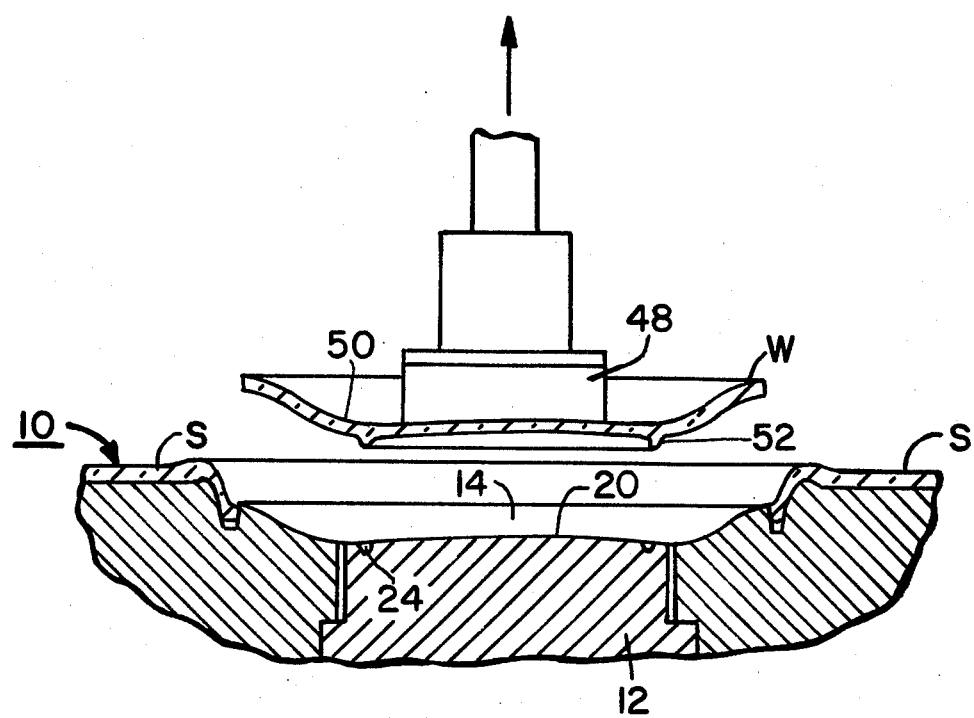
FIG. 7 is a fragmental sectional view in elevation illustrating the take out of the newly formed article.

As shown in FIG. 6, the plunger 28 and trimming member 34 are moved away from the mold assembly 10, leaving the trimmed ware article W in position within the mold cavity 14. The ware article W is not only provided with a desired contoured bottom surface of one contour, as represented by the contoured recesses 24, but also has an upper surface of another desired contour as represented by the plunger surfaces 30 and 32. Finally, as shown in FIG. 7, the ware article W is removed from the mold cavity 14 and the surrounding sheet S by means of a vacuum takeout head 48, wherein the ware article has a smoothly contoured inner surface 50 and a desired footed bottom surface 52.

Due to the fact that the molten glass sheet S may be relatively thin when delivered, such as on the order of about 0.080" to 0.125", and further in view of the fact that the sheet is virtually performed at the time it contacts the surface of the mold cavity, thinner pressings may be accomplished since there is less glass-to-mold contact time than with standard pressing procedures, and there is less glass mass to move into the finished article. That is, in a standard pressing operation, it is necessary to move a mass of glass in the form of a centrally disposed gob of a given height radially outwardly to remote peripheral areas before the molten glass within the gob sets up. However, a skin is continually being formed on the gob during its residence time between the mold and plunger, and accordingly the thinness to which the gob can be pressed may be severely limited. Further, in the pressing of a rounded gob, air is automatically pushed out of the way so as not to be entrapped as the gob is squeezed or flows outwardly during the pressing operation. However, when initially pressing a substantially flat preform, such as the sheet S of the present invention, special steps must be taken in order to avoid the entrapment of air and the lapping of the glass during pressing so as to avoid surface defects in the pressed article. Thus, the pressing of the present invention occurs from a central portion toward the edge of the article to inhibit the entrapment of air in the upper pressed surface.

The present invention provides numerous advantages over that obtained by merely pressing or vacuum forming articles. For example, footed glassware, or glassware having a lower stacking rim may be formed through a combination of vacuum forming and pressing. In addition, the upper surface of such glassware may be embossed and may be provided with sharp, crisp surface changes which are not obtainable with a vacuum formed article. Also, in view of the fact that a thin layer of virtually preformed sheet glass may be applied to a vacuum mold, it is possible to then press-form much thinner and light-weight glass sections than can be made by conventional gob-loaded pressing techniques. In addition, the process sets forth a convenient method for pressing laminated articles, such as for providing increased strength by utilizing compressive outer skin layers over a central core and by providing durable skin glass over less durable central glasses of desired compositions, by merely laying down a laminant sheet of glass having a core glass of one composition encompassed within skin glasses of other desired compositions.

Although the invention has been disclosed with respect to the vacuum forming and pressing of ware articles such as culinary items used in the consumer products line, the invention may be used for virtually any desired product including TV panels and funnels, lenses and reflectors for sealed beam headlights, and other OEM and consumer products. Further, although the described sequence of operation has set forth a pressing with subsequent trimming, if desired the trimming operation could preceed the pressing operation, and various vacuum times and cycles could be applied as deemed expedient.

Although the now preferred embodiments of the invention have been set forth, it will be apparent to those skilled in the art that various changes and modifications may be made thereto without departing from the spirit and scope of the invention as set forth in the following claims.

We claim:
1. A method of pressing glass articles from molten glass which comprises, delivering a sheet of molten glass to a surface of a mold assembly having a mold cavity formed therewithin so as to overlie the mold cavity and the surrounding surface of the mold assembly, initially permitting said sheet of molten glass to substantially conform to the contour of said mold cavity, then pressing said contoured sheet within said mold cavity while still in a semi-molten condition into an article of desired upper and lower surface configuration, trimming the glass within said mold cavity from the remainder of the sheet deposited upon surrounding surface portions of the mold assembly, and removing said completed article from said mold cavity.

2. A method of pressing glass articles from molten glass as defined in claim 1 including the step of trimming a newly press-formed glass article within said mold cavity from the remainder of the sheet deposited upon the surrounding surface portions of the mold assembly.

3. A method of pressing glass articles from molten glass as defined in claim 1 which comprises trimming the sheet of glass overlying the mold cavity from the remainder of the sheet deposited upon surrounding surface portions of the mold assembly prior to the pressing of the sheet within the mold cavity.

4. A method of pressing glass articles from molten glass as defined in claim 1 including the steps of maintaining those portions of the sheet of glass deposited upon the mold assembly which extend peripherally about said mold cavity in spaced relationship with surface portions of said mold assembly by providing a bevel and a trimming recess about the periphery of the mold cavity.

5. A method of pressing glass articles from molten glass as defined in claim 4 including the steps of pressing said contoured sheet within said mold cavity with a plunger having a nose portion conforming to the desired upper surface configuration of the pressed article, and inhibiting glass contact with said plunger peripherally of said mold by providing a bevel about peripheral nose portions of said plunger.

6. A method of pressing glass articles from molten glass as defined in claim 1 including a step of pressing said contoured sheet within said mold cavity by initially pressing central portions of the sheet within the cavity and progressively pressing radially-outwardly therefrom toward edge portions of the cavity.

7. A method of pressing glass articles from molten glass as defined in claim 1 including the steps of pressing said sheet of glass within said mold cavity with a plunger by initially contacting central portions of the upper surface of the sheet within such cavity by said plunger and progressively contacting radially outward portions of the upper surface of such sheet with said plunger and preventing air entrapment on the upper pressed surface.

8. A method of pressing glass articles from molten glass as defined in claim 1 including the step of initially permitting said sheet of molten glass to substantially conform to the contour of said mold cavity solely by means of the forces of gravity.

9. A method of pressing glass articles from molten glass as defined in claim 1 including the step of applying a vacuum to the under surface of said sheet overlying said mold cavity, and combined with the forces of gravity, permitting said sheet of molten glass to substantially conform to the contour of the mold cavity.

10. Apparatus for pressing glass articles from a sheet of molten glass delivered thereto which comprises, a mold assembly having surface portions for receiving said sheet of molten glass, at least one mold cavity formed within the surface of said mold assembly and communicating therewith, means communicating with a bottom surface of said mold cavity for venting and applying a vacuum thereto, trimming recess means formed in the surface of said mold assembly about the outer periphery of said mold cavity for suspending said sheet of molten glass in spaced-apart relationship to said mold assembly peripherally of said mold cavity, plunger means for pressing the glass sheet within said mold cavity from centrally thereof radially-outwardly toward edge portions thereof to prevent air entrapment on upper surface portions of the sheet, and trimming means axially aligned with said trimming recess means for trimming the pressed article within said mold cavity from the remainder of the sheet overlying surrounding surface portions of said mold assembly.

11. Apparatus for pressing glass articles from a sheet of molten glass as defined in claim 10 which comprises, means for inhibiting contact with said sheet of molten glass peripherally of said mold cavity during pressing, including chamfer means about a peripheral edge of said mold cavity adjacent said trimming recess means and chamfer means about peripheral edge portions of a nose portion of said plunger.

12. Apparatus for pressing glass articles from a sheet of molten glass as defined in claim 10 wherein said mold cavity is formed within a vacuum mold, and said plunger cooperates with a contour of said vacuum mold to produce sharply defined contours in both upper and lower surfaces of the pressed article formed from said sheet of molten glass.

* * * * *